Nov. 16, 1937.  A. CHRISTENSEN  2,098,953
NITRIC ACID MANUFACTURE
Filed May 26, 1934    3 Sheets-Sheet 1

INVENTOR.
AXEL CHRISTENSEN,
BY Ellis S. Middleton
ATTORNEY.

Patented Nov. 16, 1937

2,098,953

UNITED STATES PATENT OFFICE 2,098,953

NITRIC ACID MANUFACTURE

Axel Christensen, Rye, N. Y., assignor to Chemical Construction Corporation, a corporation of Delaware Application May 26, 1934, Serial No. 727,652

1 Claim. (Cl. 23—160)

This invention relates to the production of nitric acid from gases containing oxides of nitrogen and, more specifically, to an improved method and apparatus for obtaining nitric acid from gases resulting from the oxidation of ammonia.

Practically all modern plants for the production of nitric acid are based on the same fundamental procedure, namely, the air oxidation of ammonia to nitric oxide gases using a platinum gauze or similar catalyst followed by the subsequent oxidation of the nitric oxide and absorption in water or dilute nitric acid. Ordinarily the oxidation of the NO to $NO_2$ or other higher oxides which will react with water to produce nitric acid is obtained by the action of atmospheric air. When this method is used the equilibrium conditions in the absorption towers are such that a relatively large absorption space is required unless increased pressures or positive cooling below atmospheric temperatures, or both, are employed, if a nitric acid product materially greater than 55 per cent. strength is desired. Either of these alternatives involves the expenditure of considerable excess energy, which increases the cost of the product, as compressors must be used either for the brine coolers, if lower temperatures are employed, or to compress the gases if the system is operated under pressure.

In order to overcome these difficulties, numerous methods have been proposed involving the further concentration of the relatively weak acid obtained from the absorption towers. For example, it has been proposed to utilize the heat of the high temperature gases leaving the converter to effect concentration, either by indirect heating or by passing the acid from the absorbers in direct contact with the gases from the converter. The use of sulphuric acid as a dehydrating agent has also been proposed for this purpose, either with or without the use of steam or hot gases as a heating agent. Although it is possible in this manner to effect further concentration of the product acid from the absorbing towers, these processes must be considered as additional concentration steps and not as a part of the usual process of producing nitric acid.

I have now found that it is possible to produce a nitric acid of 60–65 per cent. strength from the ordinary gases issuing from an ammonia oxidation system, using only fairly cold cooling water such as is obtained without refrigeration and operating under atmospheric pressures. I have further found that, by the present invention, acid of this strength may be obtained without excessive increase in absorption volume and with an expenditure of energy per ton real $HNO_3$ only slightly higher than that used in an ordinary atmospheric plant producing 50 per cent. acid by the usual process.

The objects of the present invention are, therefore, to obtain nitric acid of higher strength than has hitherto been obtained in commercial plants, without undue increase in absorption space or the use of pressure or refrigeration; to avoid excessive expenditure of energy in the production of such acid, and to provide for a more efficient use of the absorptive space in the absorption towers than has hitherto been possible. Further objects are, by application of certain features of the invention, to provide a nitric acid plant capable of increased flexibility in operation, and to provide an oxidation and absorption system that may be varied at will to produce a product acid having a greater range of strengths than has heretofore been possible with the ordinary absorption system. A still further object is to provide an apparatus for carrying out the above process steps. Other and further objects will be in part made clear by the following description, and in part pointed out by the appended claim.

The accomplishment of the above and other objects are made possible according to the present invention, by novel employment of the reaction $$NO + 2HNO_3 = 3NO_2 + H_2O - 29{,}000 \text{ cal.}$$

which is the reverse of the absorption of $NO_2$ in water to produce nitric acid. This reaction is known per se, but to the best of my knowledge it has never been put to practical use in the production of nitric acid or otherwise. As has been stated, it is an endothermic reaction, involving consumption of considerable amount of heat and the reaction velocity is a function principally of the strength of the nitric acid reacting, the concentration of NO and higher oxides of nitrogen in the gases in contact with the acid, and the temperature at which the reaction takes place. Maximum conversion of NO to $NO_2$ according to the above reaction is favored by strong acid and a high temperature. The heat for the reaction can be supplied in different ways as, for example, from an outside source to the reaction zone or the available heat content of the entering gas may be sufficient in itself. It is, however, desirable to have the gases leaving the reaction zone at a relatively low temperature to reduce the quantity of water vapor in the effluent gases.

In order to obtain most favorable results, it is desirable to contact the gases and the acid in a continuous countercurrent flow so that improverished acid leaves the reaction zone in contact with incoming gas of high NO content, and the enriched gases leave the reaction zone in contact with cold strong acid. To obtain such conditions, one preferred method is to introduce the gases to the reaction zone at a high temperature and at an intermediate point to supply sufficient cooling to maintain the desired temperature of exit gases.

One employment of the present invention is to increase the partial pressure of the nitrogen oxides in the gas mixture coming from the ammonia oxidizer by reacting the said gases with nitric acid, the reaction being preferably carried out on the countercurrent principle with relatively close control of the temperature conditions. The enriched gas mixture so obtained is then absorbed in water or dilute nitric acid in the usual manner, but by reason of the increase in partial pressure of the nitrogen oxides and oxygen, less provision for air oxidation in the absorptive tower is necessary and the greater concentration of higher oxides of nitrogen results in a more economical utilization of the tower space. A portion of the product acid from the absorption towers is preferably used for reaction with the gases from the ammonia converter, and similarly, weak acid from the reaction tower may be passed to the absorber if desired.

The invention will be illustrated in greater detail by reference to the accompanying drawings, in which like reference numerals illustrate corresponding parts and in which.

Figure 1:
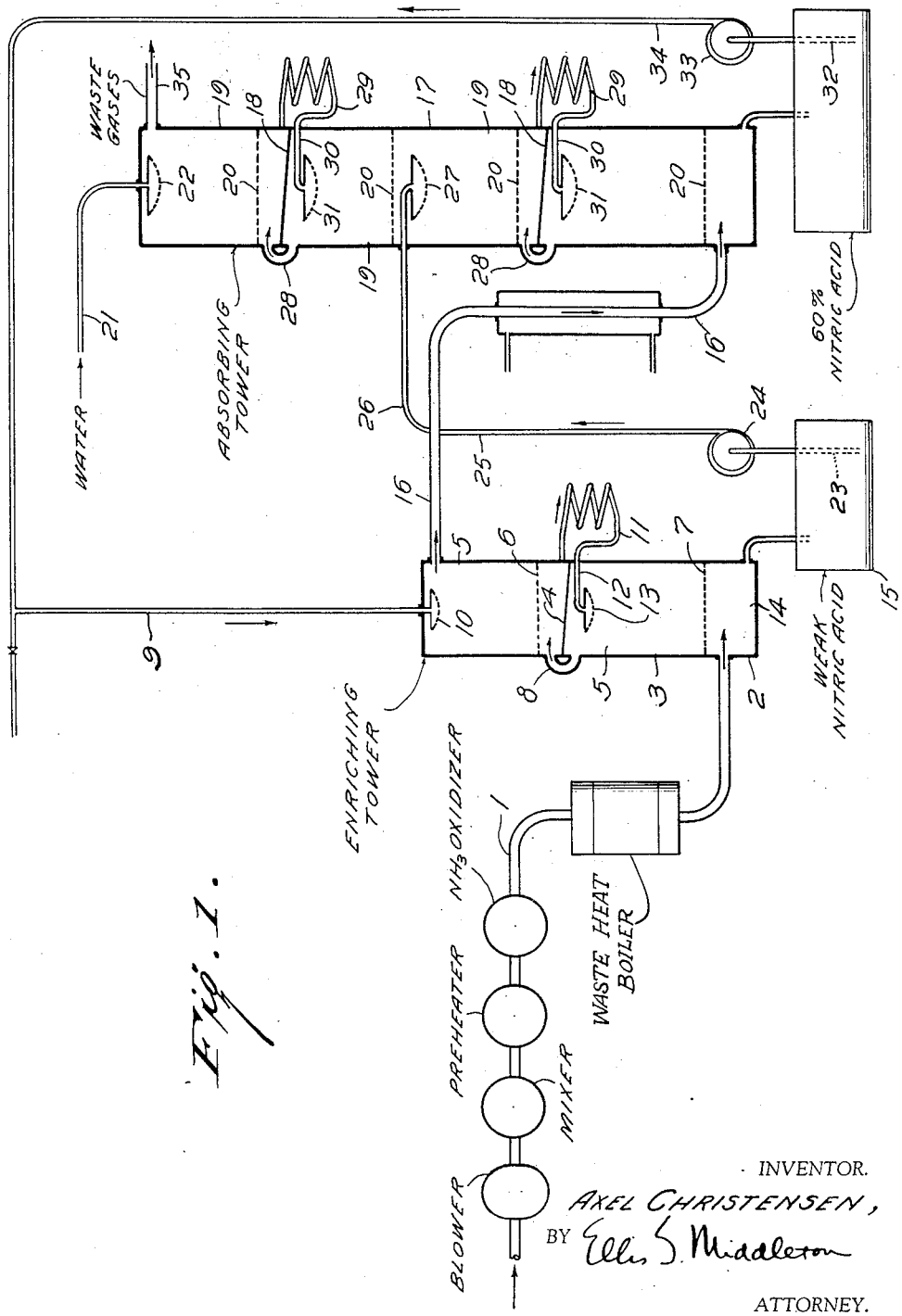
Fig. 1 is a diagrammatic illustration of an embodiment of the invention.

Referring to Fig. 1, the blower, mixer, preheater, and ammonia oxidizer are shown diagrammatically in the order named, these being conventional units of the prior art. If it is desired to operate the system under pressure, which can readily be done, a compressor may be used to replace the blower, which is the only modification necessary with the exception of the usual relief valve at the exit end of the system, but preferably such compressor should be placed in the layout beyond the enriching tower. In the ammonia oxidizer, a mixture of air and ammonia gas is passed over a platinum gauze or similar catalyst at the usual temperatures, which may be from 700–950° C. The resulting gases, containing nitric oxide, oxygen, nitrogen, and water vapor are cooled to temperatures of 200–300° C., preferably by the use of a waste heat boiler as indicated. From the boiler the gases, at the temperatures indicated, pass through the pipe 1 into the base 2 of enriching tower 3, which is a tower of acid-proof construction divided into upper and lower sections by the inclined partition 4. Each section is provided with an acid-proof packing 5, which may consist of checker work brick, molded ceramic packing, or any other suitable acid-proof material. The upper and lower packings are supported upon perforated supports 6 and 7 as is customary in towers of this type, and one or more passages are provided as at 8 for by-passing the gases around the partition 4 from the upper portion of the lower section to the bottom of the upper section.

Nitric acid from any source, but preferably obtained as product acid from the plant as will be later explained, and preferably of a concentration greater than 15–20 per cent. $HNO_3$, is fed in a continuous stream through the pipe 9 and spray head 10 into the upper portion of the top section of the tower 3, from which it flows downwardly over the packing 5 countercurrent to the rising stream of gases from the ammonia oxidizer. Cooling means such as a cooling coil 11, which may be air-cooled or immersed in a suitable cooling bath of water or brine, are provided between the upper and lower sections of the tower, it being understood that more than two sections and more than one cooling means may be provided if desired. The nitric acid from the upper section is collected by the inclined partition 4, passed through the coil 11 or other suitable cooling means, and reintroduced through the pipe 12 and spray-head 13 into the lower section of the tower 3, from which it passes over the lower packing 5, is collected in the sump 14 and passes to the weak nitric acid storage tank 15. It is an important feature of the invention that, by control of the concentration and temperature of the acid fed into the tower through the pipe 9 and by regulation of the coolers 11, temperature conditions are maintained throughout the enriching tower 3 such that the reaction $$NO+2HNO_3=3NO_2+H_2O$$

will come substantially to equilibrium at the upper section of the tower and that, consequently, with a relatively strong acid, only a relatively small proportion of the oxides of nitrogen in the gases at this point are in the form of nitric oxide. I have found that a suitable temperature for the incoming nitric acid is that which is to be maintained in the subsequent absorbing step, which presents the double advantage that no temperature regulation of the product acid from this step is necessary and that the gases leaving the enriching tower are automatically maintained at the proper temperature for the next step of the process.

The oxidized and enriched gases from the tower 3 are passed through pipe 16 into the base of absorbing tower 17, suitable means such as a water jacket being provided for further temperature regulation of the gases if necessary. This pipe 16 provides a desirable oxidation space prior to the entrance to the absorbing tower. In this tower the gas mixture, now consisting principally of nitrogen, oxygen, $NO_2$, and $N_2O_4$, with relatively small amounts of NO and saturated with water vapor at the temperature at which it leaves the upper section of the enriching tower 3 is absorbed in an aqueous absorbing medium such as water or relatively weak nitric acid to produce strong nitric acid which is an object of the invention to obtain and which flows from the base of the tower to storage as shown.

The tower 17 which is intended to indicate any conventional absorption system is made of acid proof material, and is divided into a suitable number of sections by the inclined partitions 18.

Each section is provided with acid proof packing 19 supported on perforated supports 20 in the usual manner, the aqueous absorbing medium being fed in at the top through feed pipe 21 and spray head 22. As is illustrated, weak nitric acid of a concentration of 25% $HNO_3$ or less as obtained from the bottom of the enriching tower may be employed as a constituent of the absorbing medium, being introduced at a suitable point in the absorption system, pipe 23, pump 24 and pipe 25 being provided to supply this acid to the feed line 26 and spray head 27. The gases ascend through the packing 19 and are by-passed around the partitions 18 by means of one or more passages, as at 28. The aqueous absorbing medium descending through the packing 19 countercurrent to the rising gases is collected on the inclined partitions 18, passed through the coils 29, or other suitable cooling means and re-introduced through the pipes 30 and spray heads 31 into the tower. Pipe 32, pump 33, and pipe 34 are provided to supply strong acid from storage, if desired, to the pipe 9, which feeds the enriching tower 3. The spent gases from the absorbing tower leave the process through exit pipe 35, and are discarded.

As a typical method of operating this system, it may be assumed that 9 mols of ammonia are oxidized with 91 mols of dry air at an oxidation efficiency of 95 per cent., this being a typical example of present day practice. After the waste heat boiler, the gas temperature is between 200 and 300° C., and preferably a temperature of 250° C. is maintained. At this temperature substantially all the oxide of nitrogen in the gas consists of NO and a typical gas has the following composition

Table I

|  | Mols | Percent |
|---|---|---|
| NO | 8.55 | 8.36 |
| $O_2$ | 7.99 | 7.81 |
| $N_2$ | 72.21 | 70.64 |
| $H_2O$ | 13.49 | 13.19 |
|  | 102.24 | 100.00 |

This gas mixture is passed continuously into the bottom of the enriching tower 3 and passes upwardly through the packing, then through the by-pass 8, and then through the packing in the upper section and out through the pipe 16. At the same time, 60 per cent. nitric acid from the storage tank is supplied continuously at the top of the upper section of this tower and passed downwardly in a continuous stream, flowing in countercurrent to the rising gases. During this contact, the nitric oxide of the gas reacts with the acid to produce nitrogen peroxide and water according to the reaction described above, and tests have indicated that the gas leaving the tower is substantially in equilibrium with the acid fed through the spray-head 10 under the temperature conditions prevailing in the top of the tower, which in this case are 25° C. These tests also indicate that very little of the NO reacts according to the reaction $$2NO + O_2 = 2NO_2$$

by reason of the conditions of temperature and acidity maintained in the tower as a whole.

As the reaction taking place in the enriching tower is endothermic and takes place by the aid of heat extracted from the gases a rapid cooling of the gas passing through the tower is obtained, so that the desired equilibrium temperature may be maintained at the top of the tower. However, since the heat content of the gases entering the enriching tower may be greater than the heat required for the reaction and the heating up of the acid, it may be desirable to provide intermediate cooling of the acid which has, in part, undergone reaction and is correspondingly weakened and diluted. Accordingly in one preferred form, the acid from the upper section, containing both chemically produced water and water 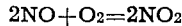 condensed from the ammonia oxidizer gases, is collected on the inclined partition 4 and is passed through the cooling coil 11, after which it is reintroduced into the lower section through the spray-head 13. In this section the reaction is less vigorous, in spite of the greater amount of sensible heat in the gases, as the nitric acid is already weakened. Consequently, the acid collected in the sump 14 may be of a strength anywhere between 15–30% $HNO_3$, although of course no loss is occasioned by operating the tower to obtain the stronger acid. In practice the tower is ordinarily operated to produce an acid of about 25% $HNO_3$ content. Since the reaction is brought substantially to equilibrium in the top section of the tower at 25° C., it has been calculated that the composition of the gas will be about as follows, based on an incoming gas mixture of the composition above described:

Table II

|  | Percent | Mols |
|---|---|---|
| NO | 1.73 | 1.72 |
| $NO_2$ | 8.50 | 8.43 |
| $N_2O_4$ | 5.65 | 5.61 |
| $O_2$ | 8.06 | 7.99 |
| $N_2$ | 72.81 | 72.21 |
| $H_2O$ | 3.25 | 3.23 |
|  | 100.00 | 99.19 |

Figure 2:
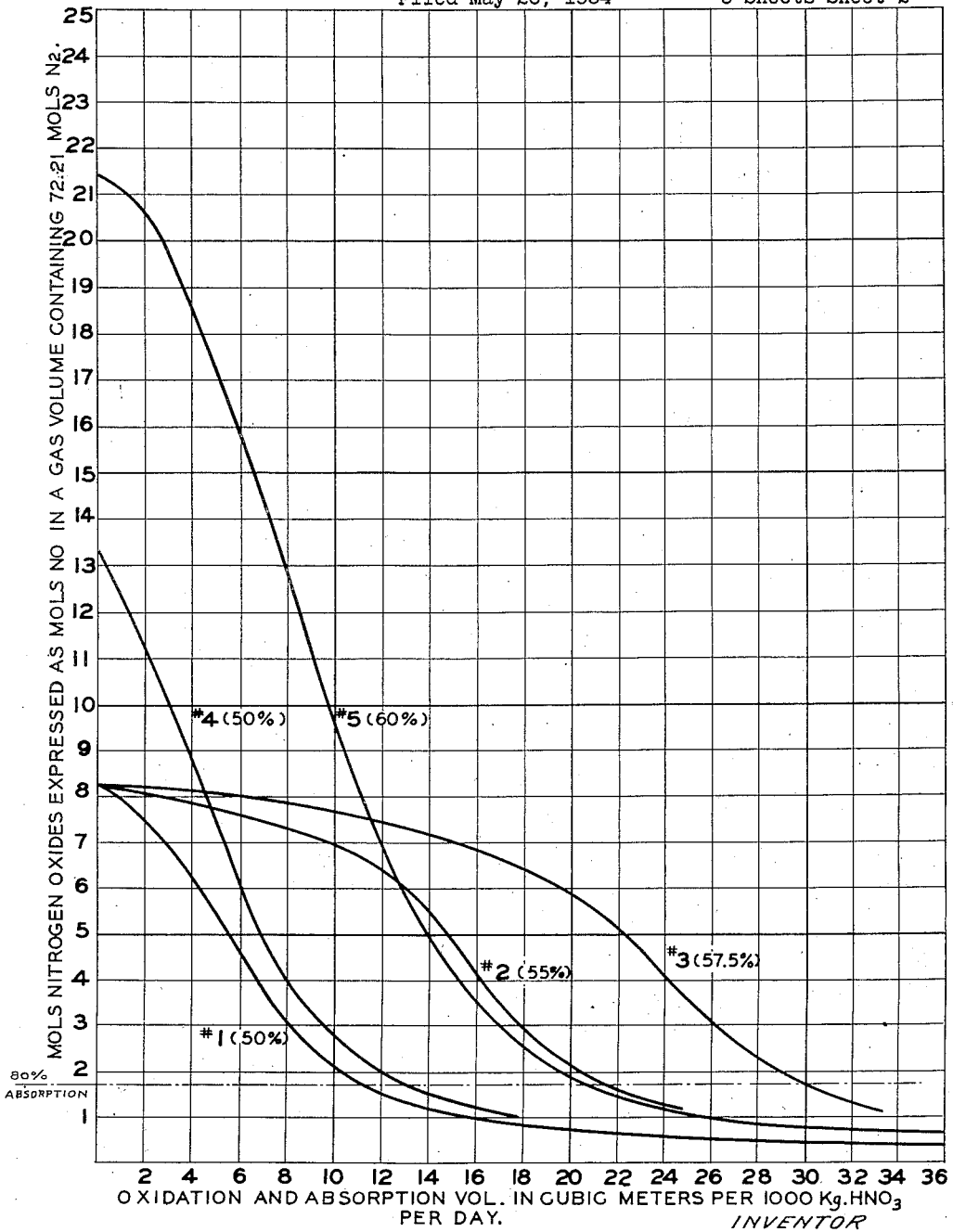
Figs. 2 and 3 are graphs illustrating the relationship between concentration of absorbable oxides of nitrogen in gases produced by reacting a standard gas leaving the ammonia oxidizer according to $NO+2HNO_3 \rightleftarrows 3NO_2+H_2O$ and oxidation and absorption volume.

A comparison of Tables I and II will show that two results have been obtained by the passage of the gases through the tower; first, the greater portion of the nitric oxide in the original gases has been oxidized to higher oxides of nitrogen capable of reacting with an aqueous absorbing medium to produce nitric acid, and second, the gases have been greatly enriched by the liberation of additional amounts of reactive higher oxides of nitrogen therein. As is shown in Fig. 2, the efficiency of the absorption towers bears a definite ratio to the concentration of absorbable oxides of nitrogen in the gases, so that the enriched mixture is capable of absorption to an acid of 60% concentration or greater in a shorter period of time, and consequently with a smaller absorption space, than would be the case with an unoxidized and unenriched gas. In fact, the gases leaving the enriching tower 3 correspond exactly to an unoxidized gas of the following composition.

Table III

|  | Mols | Percent |
|---|---|---|
| NO | 21.37 | 18.63 |
| $O_2$ | 17.81 | 15.55 |
| $N_2$ | 72.21 | 63.01 |
| $H_2O$ | 3.23 | 2.81 |
|  | 114.62 | 100.00 |

Whereas the gases going to the absorption system in a plant working according to the ordinary atmospheric system would correspond to an unoxidized gas of about the following composition:

Table IV

|  | Mols | Percent |
|---|---|---|
| NO | 8.26 | 9.05 |
| $O_2$ | 7.77 | 8.52 |
| $N_2$ | 72.21 | 79.15 |
| $H_2O$ | 2.99 | 3.28 |
|  | 91.23 | 100.00 |

It will thus be seen that, by the use of the reaction referred to with maintenance of suitable equilibrium conditions, a gas has been produced having more than twice the concentration of oxides existing in the corresponding gases in an ordinary atmospheric plant, and consisting almost wholly of higher oxides capable of reacting directly to form acid.

Referring now to Fig. 2 of the drawings, the curves show the comparative absorption conditions necessary for the production of acids of different strengths from representative gas mixtures. These graphs are plotted for an absorption temperature of 25° C., which can ordinarily be obtained without refrigeration, and sufficient water or other aqueous absorbing medium is supplied to absorb 99% of the oxides in water.

In this figure, curves Nos. 1, 2, and 3 are for systems of the ordinary atmospheric type, making respectively 50%, 55%, and 57.5% acid. The gas going to the oxidation and absorption towers contains on the unoxidized basis 9.05% NO, and the drip is added to the absorption towers as 10% acid. Curve No. 4 and curve No. 5 are for systems working with enriched gas and producing respectively 50% and 60% acid. The gas going to the absorption towers contains, on the unoxidized basis, respectively 13.35% NO and 18.63% NO, and the weak acid from the oxide producing tower is in both cases added to the absorption system as 25% acid.

For all the systems in question, the same unoxidized gas from the ammonia oxidizer is used, and since the nitrogen is an inert constituent throughout the process it forms a basis of comparison for the various curves. Therefore, when we possess volumes of gas containing equal amounts of nitrogen in different systems, we have, in each case, possessed the same amount of reactive constituents of gas from the ammonia oxidizer.

Figure 3:
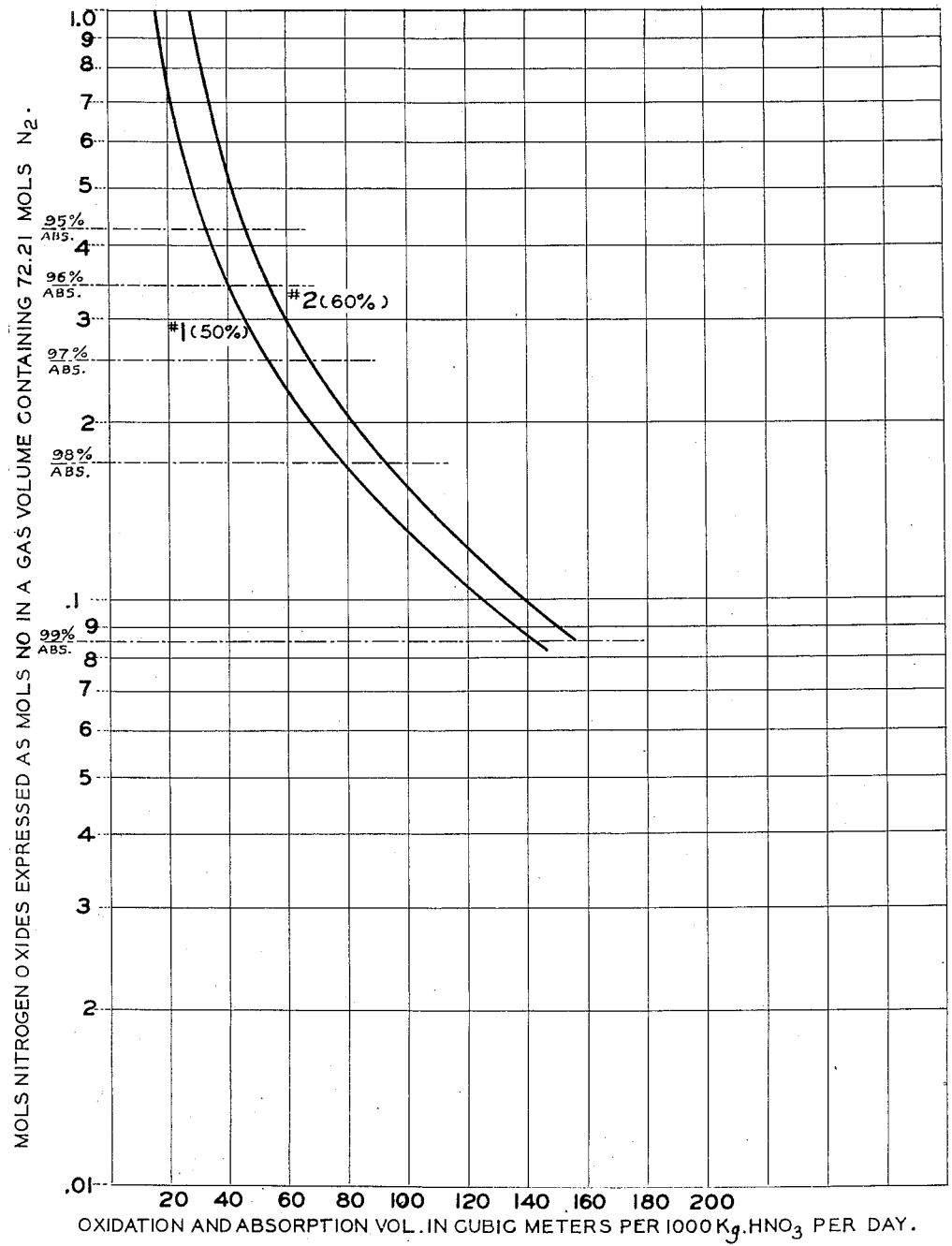

The curves shown on Figures 2 and 3 are plotted for gases produced from an original gas from the oxidizer of composition as given in Table I, and all volumes processed contain 72.21 mols of nitrogen. To compare the respective amounts of absorption and formation of removable acid in the different systems, it is only necessary to compare the number of mols NO that remain in a volume of gas containing 72.21 mols of nitrogen at any given point in the absorption process; in other words, the comparison is made on the amount of unabsorbed nitrogen oxides left in the system rather than on the amount that has been absorbed and removed.

From Fig. 2 therefore, it is seen that when an 80% absorption of productive oxides has been obtained, that is, when an amount of oxides equal to 20% of oxides leaving the burner is still left in the gases, the volume required for each additional per cent. of absorption can be considered the same for all systems.

In Fig. 3 curves No. 1 and No. 2 are, respectively extensions of curves No. 1 and No. 5 of Fig. 2 to show the relative absorption conditions for the last few percentages of absorption. In order to show this more clearly, the abscissas used in this figure are the logarithmic functions of the ordinates, in other words the curves are plotted on the ordinary "semi-log" paper. These curves show, as above stated, that when the gases have been depleted in oxides to contain only 20% of oxides leaving the burner, the volume required for each additional per cent. absorption can be considered the same for all systems.

Since, therefore, both the ordinary system and the system operating in accordance with the principles of the present invention, after an absorption of approximately 80% of productive oxides has been reached, work under approximately the same conditions and require the same volume for absorption of the same quantity of nitrogen oxides, the benefit derived from the present invention lies in the conditions under which the first stages of absorption take place.

The effect of enrichment of the gases on their acid making quality can be estimated from Figure 2. When producing acid according to the procedure indicated by curve No. 5, it is seen that when the gases have been depleted to a content of 1.71 mols of oxides, we have formed 19.66 mols of 60% nitric acid in a volume of 20.7 cubic meters, or the formation of one mol. of acid requires 1.05 cubic meters tower volume. When producing acid according to the procedure indicated by curve No. 1 we require a volume of 11.4 cubic meters to deplete the oxides to 1.71 mols and form 6.55 mols of 50% acid. Therefore, the volume required per mol. of acid formed is 1.74 cubic meters. It is therefore seen that acid of 60% strength can be produced in less volume with enriched gas than 50% acid can be produced with gases of the composition usually delivered to the absorption train in an ordinary plant. However, when operating according to Figure 1, part of the acid produced in the absorption system is decomposed in the enriching tower and enters into a continuous cycle; therefore, only the acid formed from the oxides leaving the burner can be removed as product. Nevertheless, referring to Figure 2 when comparing curve No. 5 and curve No. 2, we find that when operating according to Figure 1, we can produce 60% acid in a smaller volume than we can produce the same quantity of 55% acid when employing an ordinary atmospheric system.

It will, of course, be apparent to those skilled in the art that while the layout shown and described was designed primarily for operation at atmospheric pressure, yet the same may be satisfactorily carried out under higher or lower pressures if desired without sacrificing any substantial advantages.

Where desired, positive cooling may be used, particularly during absorption.

While the invention has been shown and described with particular reference to certain apparatus and sets of conditions, yet obviously it is not to be limited thereto but is to be construed broadly and limited only by the scope of the claim.

What I claim is:

A method of producing nitric acid which comprises oxidizing ammonia with air to produce a gas mixture containing nitric oxide, passing said gas mixture after suitable cooling through an enriching tower in countercurrent to a flow of relatively cold nitric acid under conditions such that higher oxides of nitrogen are produced by the reaction $NO + 2HNO_3 = 3NO_2 + 3H_2O$, passing the resulting gas mixture through an absorbing tower counter to a flow of an aqueous absorbing medium including spent acid from the bottom of the enriching tower, and feeding a portion of the condensate from said tower into the top of the enriching tower.

AXEL CHRISTENSEN.